United States Patent [19]

Sniader

[11] 4,346,567
[45] Aug. 31, 1982

[54] HEAT PUMP CONTROL VALVE

[76] Inventor: David H. Sniader, 1225 Spruce St., Winnetka, Ill. 60093

[21] Appl. No.: 117,076

[22] Filed: Jan. 31, 1980

Related U.S. Application Data

[63] Continuation of Ser. No. 860,592, Dec. 14, 1977, abandoned.

[51] Int. Cl.³ ............... F25B 13/00; G05D 23/12
[52] U.S. Cl. .......................... 62/160; 62/183; 236/1 C
[58] Field of Search ............ 62/183, 185, 160, 324.1, 62/184; 236/1 C

[56] References Cited

U.S. PATENT DOCUMENTS

| | | | |
|---|---|---|---|
| 2,309,132 | 1/1943 | Mills et al. | 62/184 |
| 2,709,897 | 6/1955 | Millikan | 62/184 |
| 3,273,796 | 9/1966 | Bauerlein | 236/1 B |
| 3,275,067 | 9/1966 | Sniader | 165/29 |
| 4,120,173 | 10/1978 | Kimpel | 62/184 X |
| 4,139,150 | 2/1979 | Graversen et al. | 236/1 B |

Primary Examiner—William E. Wayner
Attorney, Agent, or Firm—Myers & Dvorak

[57] ABSTRACT

A control system for regulating the flow of water to the condenser to maintain most effective loading of the compressor in a water-to-air heat pump arrangement. The system incorporates a temperature sensitive valve which has a thermal transfer contact with the refrigerant flowing through the heat pump compressor which upon sensing the heat in the refrigerant rising or falling correspondingly variably opens and closes the water line to the heat exchanger so as to maintain the temperature at the compressor within a predetermined range, and maintain proper loading on the compressor during heating and cooling cycles of the heat pump.

15 Claims, 4 Drawing Figures

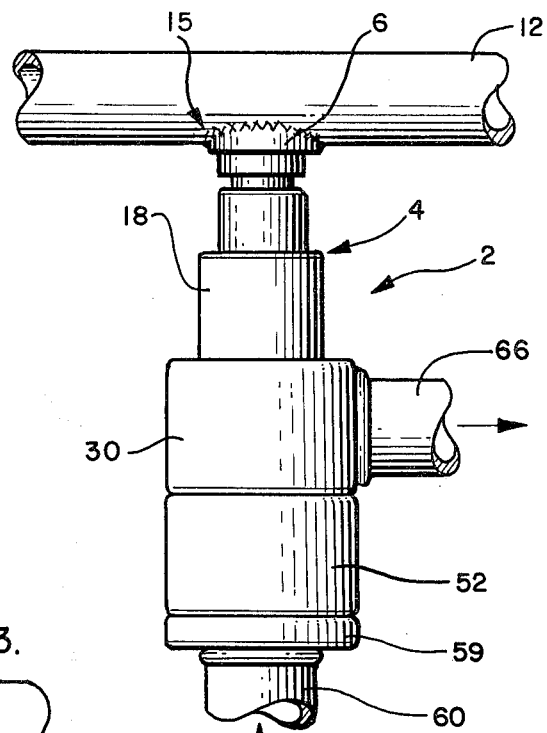
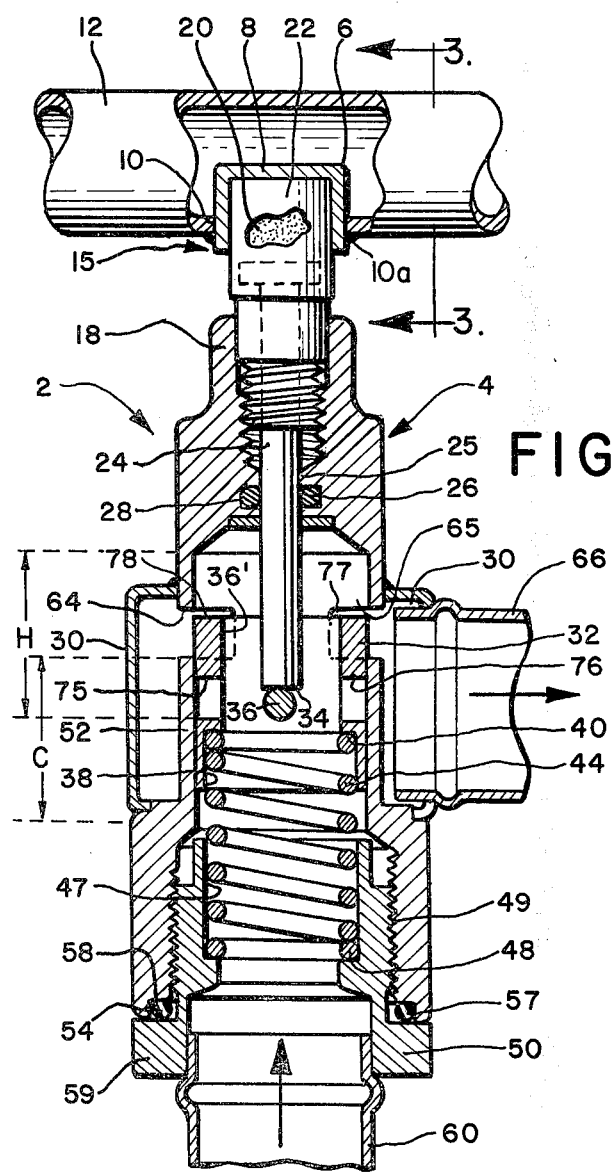
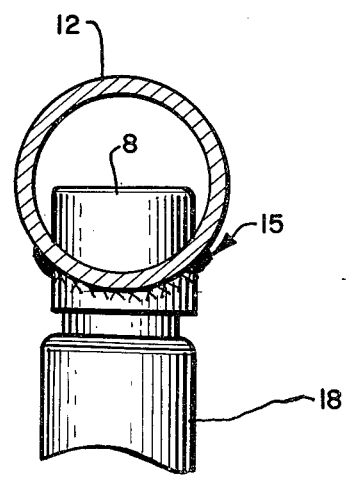
FIG. 1
FIG. 2
FIG. 3

HEAT PUMP CONTROL VALVE

This application is a continuation of Ser. No. 860,592, filed Dec. 14, 1977 now abandoned.

SUMMARY OF THE INVENTION

A water-to-air heat pump system comprises a water circulating pump, a cooling tower, a hot water heater, a storage tank and several water-to-air heat pumps which are located in the spaces to be cooled and heated.

The circulating pump supplies water to each heat pump in parallel flow. This water is then pumped through a system of the cooling tower and/or ground, tank and/or heater in a continuous cycle or loop.

Since the water flow through each heat pump is constant, the water temperature must be controlled in the system. To provide proper condenser cooling when the heat pump is used on the cooling side and the correct heating capacity when used in the heating mode, the water temperature should be maintained at approximately 95° F. maximum and 60° F. minimum.

However, at 95° F. inlet water temperature and flow of 2 to 3 Gallons Per Minute per Ton of cooling capacity, the heat pump compressor will normally be overloaded. With the same water flow rate at 70° inlet water, the heat pump compressor will function at proper loading conditions.

Secondly, in the heating season when water systems temperature may be 50° F. and the heat pump is operated in the cooling mode, the refrigeration system is subject to over condensing, causing liquid refrigerant to return to the compressor (slugging) and possibly freezing the evaporator.

Since the loading of a water-to-air heat pump is a function of both temperature and rate of flow of coolant water, controlled condensing in the unit would yield a constant load on the compressor and eliminate most malfunctions of the heat pump compressor, resulting in increased compressor life.

A principal object of the invention is to provide a self-regulating monitoring system in which the temperature of the heat pump refrigeration line is utilized to regulate and variably open and close a water coolant line for the compressor in accordance with preset requirements.

The invention incorporates a novel heat sensitive pellet encased within a metal capsule which is extended through an opening in a side of a refrigerant line to sense the temperature thereof.

The invention comprehends the use of thermostatic activators which may be readily installed in current equipment and function within prescribed parameters without extensive adjustment or modification of the equipment.

These and other objects and advantages inherent in the invention will become more apparent from the specification and the drawings, wherein:

FIG. 1 is a side elevational view of refrigerating-heat pump system incorporating the invention;

FIG. 2 is an enlarged sectional view;

FIG. 3 is a cross-sectional view on line 3—3 of FIG. 2; and

DESCRIPTION OF THE INVENTION

Figure 4:
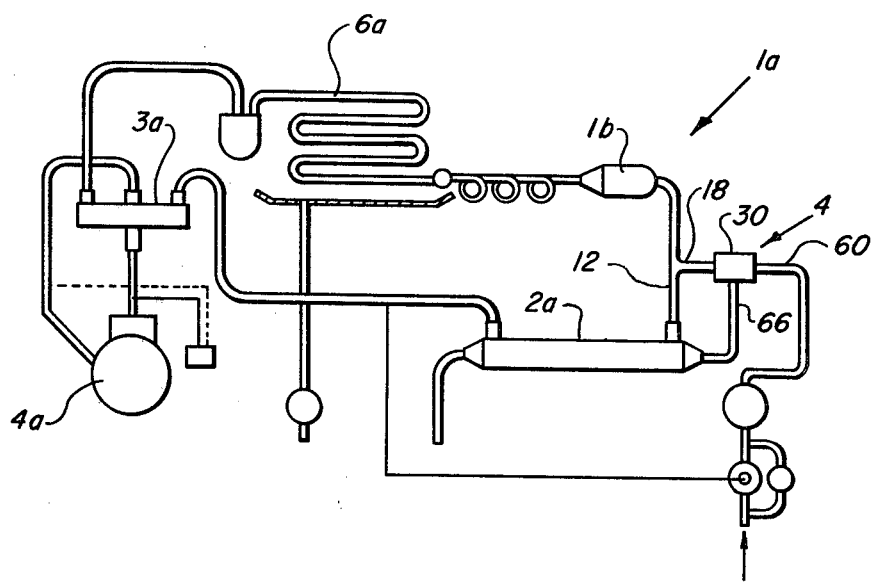
FIG. 4 is a schematic of the heat pump system as it could be used in a conventional reversible heat pump system.

Describing the invention in detail, the control system generally designated 2 is incorporated into any reverse cycle heat pump system as disclosed in my U.S. Pat. No. 3,275,067, and may take the form as shown in FIG. 4 and described as follows:

Cooling is accomplished by removing heat from the conditioned area by means of a refrigeration or heat-pump system 1a and transferred to water flowing through the heat exchanger 2a which functions as a condenser during a cooling cycle, as shown in FIG. 4.

When a thermostat (not shown) in a room calls for cooling, a reversing valve 3a is set for the cooling cycle. A blower (not shown) and a compressor 4a are started. The compressor 4a pumps a hot compressed gas through the water-cooled condenser 2a, wherein heat is given off and the gas condenses to a liquid. The liquid passes through a line 12 through a strainer and a capillary tube 1b and then continues to the evaporator 6a where heat in the room is absorbed by the liquid refrigerant in the evaporator coils, causing the refrigerant to boil and form a gas. The cycle is completed with the refrigerant gas being removed by the compressor 4a, the gas being compressed and the cycle being repeated.

When the wall thermostat calls for "heating", the reversing valve 3a is energized and determines the refrigerant flow path. The compressor 4a starts and pumps a hot compressed gas to the fin coil heat exchanger 6a which functions as a condenser during a heating cycle, where the hot gas is condensed to a liquid and gives up heat to the air surrounding the coils. The air is warm and is delivered by a blower, either directly or through a duct to the desired room area. The liquid refrigerant then passes through the strainer and the capillary tube 1b and expands into a cold liquid within the heat exchanger 2a, which now functions as an evaporator. Thereafter, the refrigerant gas passes to the compressor suction line and the cycle begins again.

The control system 2 comprises a thermo-sensitive valve 4 which comprises an end plug 6 having a preferably cylindrical end cap 8. The cap 8 is preferably metal, such as copper and extends through a complementary opening 10 (FIG. 2) in a metal refrigerant line 12 one end of which is connected to the heat exchanger or evaporator 6a and the other end to the heat exchanger or condenser 2a for conducting refrigerant fluid therebetween in thermal heat exchange contact with the end cap 8. The cap is soldered or brazed at 10a by silver solder to the pipe 12 to provide a leak-proof seal.

A pellet 20 having controlled thermal expansion properties is sealed within a copper cup 22 fitted complementally in good thermal contact within the cap 8. Temperature changes produce volumetric expansion and contraction of this material which is translated into movement of the piston stem 24 slidably mounted within a bore 25 in the valve body 18. An O-ring 26 is fitted within a groove 28 and embraces the stem or rod 24 to provide a water-tight fit.

The lower end of the body is provided with a valve chamber 30 within which is slidably fitted a valve member 32. The piston stem 24 extends through chamber 30 into the valve element 32 and seats at a lower end 34 of the piston stem upon a transverse stop or abutment pin 36 secured to the element 32. The valve element 32 has an axial bore 36' and is provided with a shoulder 40 against which the upper end of a compression spring 44 is seated. The spring is fitted into an enlarged bore 38 in the lower end of element 32 through the lower open end thereof. The lower end of spring 44 extends into bore 47 and seats upon a shoulder 48 formed on the inner side of an end nipple 50 which is threaded into the inner thread 49 of the lower end of valve sleeve 52 which forms the lower end of the valve body 18 and slidably receives valve element 32 in a fluid tight fit therein. A sealing O-ring 54 is sleeved over the nipple 50 and is fitted within a groove 57 in the valve sleeve 52, and is compressed between shoulder 58 of sleeve 52 and flange 59 of the nipple 50.

Inlet pipe 60 is connected to the nipple 50 and communicates with bores 47, 36' and through ports 64, 65 in sleeve 52 communicates with the valve chamber 30. The chamber 30 is connected to a pipe 66 which communicates with the water to refrigerant heat exchanger 2a.

The inlet pipe 60 is connected to a water inlet line leading from any source of coolant water and the outlet pipe 66 is connected to the water to refrigerant heat exchanger 2a, as well known to those skilled in the art.

It will be appreciated that when the thermal pellet expands because of increased temperature in the refrigerant line, and actuates or pushes the stem 24 downwardly, the stem 24 moves the valve element 32 down to crack the opening of ports 64,65 more or less depending upon the expansion or contraction of the capsule, thus allowing more or less water through the heat exchanger 2a. As can be viewed in FIG. 2, the ports 64,65 in the valve sleeve 52 define an orifice 77 through which water will flow into the outlet pipe 66. It will be understood that this valve is never fully closed under normal circumstances as best seen in FIG. 2.

The pellet used is sold by Robertshaw Controls Company under their trademark "POWER PILL" for Thermostatic Actuators #22204-R and obtains about 5/16" travel.

The valve element 32 moves up and down and operates in different zones of the valve chamber 30 for each operating cycle (heating or cooling). In moving towards or away from the temperature responsive pellet 20, valve element 32 varies the size of the orifice 5 inside the valve 4 and thus controls the amount of water flowing through the outlet tube 66 connected to the heat exchanger 2a.

When the ambient temperature is approximately 68°-70° F., the control valve 4 is in an inactive (or neutral) position.

In a heating cycle (40°-60° F. refrigerant liquid line temperature range), when the temperature of the refrigerant decreases, the valve element 32 moves toward the temperature sensing pellet (upwardly according to FIG. 2) to progressively increase the opening of the orifice to the water line 66 from a partially open position to a fully open position. At the fully open position in the heating cycle, the valve element 32 permits required flow of water from the inlet pipe 60 to the outlet tube 66.

In a cooling cycle (80°-100° F. refrigerant liquid line temperature range), when the temperature of the refrigerant increases, the valve element 32 moves away from the temperature sensing pellet 20 (downwardly according to FIG. 2), to progressively increase the opening of the orifice 77 to the water communicating with outlet tube 66 from a partially open position to a fully open position. At the fully open position, in the cooling cycle, the valve element 32 is disposed below the orifice 77 furthest away from the temperature responsive pellet 20. Fully open means that the ports 64, 65 are not restricted by the valve member 32.

Of course, should the temperature (of the refrigerant) in the refrigerant line 12 increase in a heating cycle or decrease in a cooling cycle, valve element 32 will move in a direction opposite to that indicated, but still within the particular "operating zone" indicated, i.e., the zone closest to the temperature sensing pellet in a heating cycle and the zone furthest away from the temperature sensing pellet in a cooling cycle.

It should be stressed that the control valve system of the instant invention reverses the direction of movement and the zone of operation of the valve element 32, in dependence on reversal of the cycles in the particular heat pump system in which it is incorporated.

Control valve system 2 is incorporated in the reverse cycle heat pump system as illustrated in FIG. 4. The thermo-sensitive end of the valve 4 extends into the refrigerant line 12 between heat exchangers 2a and 6a.

The heat pump system is provided with a conventional reversing valve 3a that is activated by a conventional thermostat. When the reversing valve is activated to reverse the cycle from heating to cooling and vice versa, there is also a change in the temperature of the refrigerant in line 12. This in turn affects the thermosensitive valve 4 to change the direction of movement from a direction toward the temperature sensitive element of valve element 32 to a direction away from it and its zone of operations, from top to bottom, and vice versa.

In actual trials of this system, the system performed exceptionally as shown in the table below.

This table illustrates the advantages obtained with the instant invention. The control valve can maintain effective control of the compressor load by varying the flow of water into the heat pump system and with entering water temperature ranging from 42° F. to 120° F. The table on Page 6 shows a comparison of data obtained by the inventor by using the control valve system with varying parameters of water and ambient temperatures, refrigerant temperatures, compression suction temperatures, compressor suction and discharge pressures in p.s.i., and water rate of flow. It demonstrates, for example, that water entering the system (at ambient temperature of 80° F.) at 40° F. (in a heating cycle) requires a rate flow of 4.9 g.p.m. for effectively maintaining a compressor load of 215 p.s.i. However, water entering the system (ambient temperature of 80° F.) at the temperature of 125° F. requires a flow rate of only 1.5 g.p.m. (in a heating cycle) for effectively maintaining a compressor load of 291 p.s.i. This means that, in a heating cycle, the control valve will have to increase the flow of the water (increase the opening of the orifice 77 to the water line) when the temperature of the entering water (from the source) is decreasing. In a cooling cycle (as could be verified from the table), the control valve will have to increase the flow of the water to the system when the temperature of the entering water (from the source) increases.

The heat pump valve operated as follows:

HEATING CYCLE

In the heat mode, the heat pump system 1a takes the heat from the water and heats the air in the space to be heated. As the heat is removed (with low entering water temperature) the temperature of the refrigerant in line 12 decreases (assuming a constant water flow). As the temperature decreases, the pellet contracts to an extent allowing the piston stem 24 and valve element 32, under expansion of spring 44, to move toward the pellet. Ports 75,76 in valve element 32 align with ports 64,65 and as the temperature in line 12 gets lower the openings 75,76 64,65 enlarge thereby permitting the water flow to increase. This provides additional load to the compressor 4a and begins to increase the temperature of the refrigerant in line 12.

This decreases the load on the compressor 4a and decreases the temperature of the refrigerant in line 12.

When the temperature in the refrigerant line decreases, there will be a decrease in the expansion of the temperature sensing element 20, and valve element 32 will move in a direction towards the sensing element. However, under ordinary circumstances, the valve

| Air of *D.B./WB | Air of Out D.B./WB | Water In #1 | Water Out #2 | Liq. Refrig Line #3 | Compr. Suct. #4 °F. | Comp. Disch. Press psi | Comp. Suct. Press p.s.i. | Water Flow G.P.M. | V.P.** | Mode |
|---|---|---|---|---|---|---|---|---|---|---|
| 80 | 95 | 40 | 35 | 38 | 34 | 215 | 45 | 4.9 | .8 | Heat |
| 72/60 | 55/50 | 41 | 59 | 52 | 67 | 140 | 56 | 3.6 | .8 | Cool |
| 64/57 | 53/49 | 50 | 81 | 77 | 44 | 185 | 60 | 2.0 | .8 | Cool |
| 73/64 | 57/54 | 55 | 86 | 80 | 53 | 200 | 66 | 2.1 | .8 | Cool |
| 76/63 | 59/55.5 | 61.5 | 94 | 86 | 51 | 217 | 70 | 2.2 | .8 | Cool |
| 76/63 | 59/55 | 66 | 95 | 87 | 50 | 217 | 70 | 2.4 | .8 | Cool |
| 78/65 | 61/57.5 | 70 | 98 | 88 | 60 | 225 | 72 | 2.6 | .8 | Cool |
| 80/67 | 62.5/58.5 | 75 | 101 | 89 | 57 | 230 | 75 | 2.8 | .8 | Cool |
| 80/66 | 61.3/57.3 | 80 | 98 | 86 | 68 | 215 | 70.5 | 3.9 | .8 | Cool |
| 80/67 | 62.5/58.7 | 85 | 102 | 90 | 65 | 230 | 74 | 3.9 | .8 | Cool |
| 80/67 | 63/59 | 90 | 105 | 93 | 68 | 235 | 74.5 | 4.7 | .8 | Cool |
| 81/68 | 63.5/59.5 | 95 | 108 | 98 | 69 | 245 | 76 | 5.1 | .8 | Cool |
| 82/68 | 64/59.8 | 100 | 113 | 103 | 65 | 250 | 78 | 5.3 | .8 | Cool |
| 77/ | 103.8/ | 130 | 102 | 63 | 98 | 273 | 80 | 1.85 | .82 | Heat |
| 80/ | 112/ | 125 | 90 | 65 | 88 | 291 | 82.5 | 1.5 | .82 | Heat |
| 79/ | 107/ | 85 | 75 | 56 | 79 | 265 | 74 | 4.6 | .82 | Heat |
| 78/ | 106/ | 80 | 70 | 55 | 74 | 262 | 73 | 4.5 | .82 | Heat |
| 78/ | 106/ | 75 | 65 | 55 | 68 | 262 | 72 | 4.6 | .82 | Heat |
| 78/ | 106/ | 70 | 60 | 54 | 59 | 257 | 69 | 4.7 | .82 | Heat |
| 78/ | 104/ | 65 | 57 | 52 | 50 | 250 | 66 | 4.7 | .82 | Heat |
| 78/ | 101.5/ | 60 | 52 | 49 | 46 | 237 | 60 | 4.7 | .82 | Heat |
| 77/ | 100/ | 55 | 49 | 47 | 44 | 230 | 57 | 4.7 | .82 | Heat |
| 74/ | 95.5/ | 50 | 44 | 43 | 41 | 215 | 51 | 4.7 | .82 | Heat |

*D.B. — Dry Bulb
W.B. — Wet Bulb
**V.P. — Velocity Pressure

When the temperature in the refrigerant line increases, there will be a decrease in the contraction of the temperature sensing element, and the valve element 32 will move in a direction away from the sensing element. However, under ordinary circumstances, the valve element 32 will still operate in the zone immediately adjacent to the temperature sensing element (or upper part of the control valve body).

When a predetermined temperature of the refrigerant is reached, the piston will stay in the correct position proportionately positioning element 32 with reference to sleeve 32 to balance the water flow by controlling the position of ports 75,76 with respect to ports 64,65 and yield proper loading on the compressor. Should the water temperature increase in the control system 2, the valve 32 will decrease the water flow through the heat pump to again balance the load on the heat pump compressor 4a. Conversely, should the water temperature in the loop decrease, the valve element 32 will increase the flow to compensate for this.

COOLING CYCLE

In the cooling mode (the valve position as shown in FIG. 2), the heat from the space to be cooled is removed by the heat pump system 1a and transferred to the water in the loop. When the water temperature is high, increasing the load on the compressor 4a, the temperature of the refrigerant in line 12 increases. This causes the pellet 20 to expand, moving the piston stem 24 and valve element 32 away from the pellet 20 and increases the opening 77 between the upper edge 78 of the valve 32 and ports 64,65, allowing more water to flow through the ports 64,65 into the heat exchanger.

element 32 will still operate in the zone furthest away from the sensing element (or the bottom part of the control valve body).

When the predetermined temperature of the refrigerant is reached, the piston will find the correct position to balance the water flow to the heat pump system and properly load the compressor 4a. Should the water temperature in the loop decrease, the valve will decrease the water flow through the heat exchanger 2a to again balance the load on the compressor.

This valve provides some water flow through the heat pump at all times, thereby permitting the heat pump to operate after start-up, and allow time for the valve to sense the refrigerant temperature and position itself correctly.

The use of this valve in a heat pump eliminates the need for:

(a) Constant flow valves in each heat pump;
(b) Precise temperature control of the water loop system;
(c) Special compressor overload protection devices.

This valve permits proper operation of water to air heat pumps at any water inlet temperature from 42° F. to 125° F., and at any excessive water flow rate or water pressure in the loop.

I claim:
1. In a heat pump system for selectively heating and cooling a room, the system including a compressor, first and second heat exchangers each of which being connected to the compressor and to each other, a refrigerant line for conducting a refrigerant fluid to said first and second heat exchangers, the refrigerant line con- necting the compressor and said first and second heat exchangers so as to form a closed circuit, said first heat exchanger serving as an evaporator in a cooling cycle and as a condenser in a heating cycle, said second heat exchanger serving as a condenser in a cooling cycle, and as an evaporator in a heating cycle, and a line for conducting water to and through said second heat exchanger, the water serving as a heat exchange medium therein in addition to the refrigerant fluid, the improvement which comprises valve means responsive to temperature variations in the refrigerant line connecting said first and second heat exchangers for selectively regulating the flow of water in the water line leading to said second heat exchanger, said valve means comprising a self-regulating valve for controlling the flow of water into the water line by varying the size of the orifice of the latter, said self-regulating valve being provided with temperature sensing means extending directly into the refrigerant line, the orifice of the water line being partially open at all times, so as to allow time for the temperature sensing means to sense the refrigerant temperature and to allow said self-regulating valve to position itself correctly relative to the orifice of the water line.

2. The invention according to claim 1, wherein said self regulating valve, during the heating cycle with decreasing refrigerant temperature, moves progressively in a direction towards the temperature sensing means thereby varying the size of the orifice of the water line leading to said second heat exchanger, from a partially open position to a fully open position, and in a cooling cycle with increasing refrigerant temperature, the self regulating valve moves progressively in a direction away from the temperature sensing means, varying the size of the orifice of the water line leading to said second heat exchanger from a partially open position to a fully open position, so that when the orifice of the water line is in a fully open position in the heating cycle the self regulating valve is disposed at the side of the orifice adjacent to said temperature sensing means, and when the orifice is in a fully open position in the cooling cycle the self regulating valve is disposed at the side of the orifice furthest from said temperature sensing means.

3. The invention according to claim 1, wherein the self regulating valve controls the flow of water into the water line by varying the size of the orifice of the water line, in response to temperature variations in the refrigerant line and in response to temperature variations in the water line leading through said second heat exchanger.

4. The invention according to claim 1, wherein said valve means comprise means for increasing water flow to said second heat exchanger upon sensing a decrease in temperature in the refrigerant line during the heating cycle.

5. The invention according to claim 1, wherein said valve means comprise means for throttling the flow of water to said second heat exchanger upon sensing an increase in temperature in the refrigerant line during the heating cycle.

6. The invention according to claim 1, wherein said valve means comprising an expandable and contractible heat sensing element extending into the refrigerant line, regulating valve in the water line, and means for translating the expansion and contraction of said element to adjustment of the position of the valve in relation to the water line so as to regulate the flow of water therethrough.

7. The invention according to claim 1, said valve means including a valve having a body connected to said water and refrigerant lines and having a heat sensitive element in thermal transfer to the refrigerant at one end and having a flow proportioning valve at the other end, and means for translating the expansion and contraction of the element into properly positioning said valve relative to said water line.

8. The invention according to claim 1, wherein said valve means comprise means for increasing water flow to said second heat exchanger upon sensing an increase in temperature in the refrigerant line and for decreasing the flow of water to said second heat exchanger upon sensing a decrease of temperature in the refrigerant line during the cooling cycle.

9. The invention according to claim 1, said valve means having a common body extending between said lines and having an expandable and contractible element at one end in said refrigerant line and having a regulating valve in the water line, and means comprising a motion-transfer element interconnecting said element with said regulating valve.

10. In a heat pump system for selectively heating and cooling a room, the system including a compressor, first and second heat exchangers each of which being connected through a reversing valve to a compressor, said reversing valve being controlled by a temperature responsive controller associated with said room, said controller being effective to initiate a cooling or a heating cycle in the system, a refrigerant line for conducting a refrigerant fluid between said first and second heat exchanger, said refrigerant line completing a closed refrigerant flow circuit, said first heat exchanger serving as an evaporator during a cooling cycle and as a condenser during a heating cycle, said second heat exchanger serving as a condenser during a cooling cycle and as an evaporator in a heating cycle, and a line for conducting water to and through said second heat exchanger in a heat transfer relationship with said refrigerant fluid, the improvement which comprises valve means responsive to temperature variations in said refrigerant line connecting both of said exchangers for regulating the flow of water in the water line leading to said second heat exchanger, said valve means comprising a valve having a body connected to an inlet pipe supplying water and connected to an outlet pipe connected to said second heat exchanger, said body being provided with a chamber in communication with said inlet and outlet pipes, a valve sleeve disposed in said chamber and defining flow ports in conjunction with said body, a valve element having an unsupported end and slidably disposed within said valve sleeve and provided with control ports adapted to move in a particular direction to align with said flow ports to regulate the flow of water between said pipes, an expandable and contractible temperature responsive sensing means disposed in said body and extending into said refrigerant line, and actuating means for moving said valve element with respect to said valve sleeve to control water flow between said pipes through flow and control ports, whereby, during a heating cycle as determined by the controller, the sensing means, as a result of lowering temperature in said refrigerant line, will contract and permit said actuating means to move said valve element toward said sensing means to align said flow and control ports for full flow of water between said pipes, and whereby, during a cooling cycle as determined by the controller, the sensing means, as a result of rising temperature in said refrigerant line, will expand and oppose said actuating means and move said valve element in an opposite direction away from said sensing means to depress said valve element into said valve sleeve and to control the water flow through an opening developed between the flow ports and the unsupported end of said valve element for full flow of water between said pipes.

11. The invention according to claim 10, wherein said actuating means comprises a biasing member disposed in said body and adjacent said inlet pipe and biasing said valve element in a direction toward said sensing means, said valve element having an abutment pin, and said sensing means having a thermally sensitive pellet sealed in a cup having one end connected to a piston stem which abuts said abutment pin to translate the motion of expansion to said valve element in opposition to the force exerted by the biasing member.

12. A heat pump system operating under a heating cycle for temperature ranges between approximately room temperature and some 30° F. or so thereabout and also operating in a cooling cycle mode between approximately room temperature and approximately 110° F. or so,
   a liquid refrigerant to air fan-type heat pump,
   a liquid refrigerant to water heat pump, and
   a reversing valve means for operating in the heating cycle mode for warming the designated room and alternately in the cooling cycle for cooling the room,
   the liquid refrigerant to air pump operating as an evaporator during the heating cycle and as a condenser during the cooling cycle and the liquid refrigerant to water pump acting as a condenser during the cooling cycle and an evaporator during the heating cycle,
   the improvement comprising a novel valve arrangement for supplying a quantity of heat to the room during the heating cycle and extracting heat from the room during the cooling cycle in various amounts in accordance with the degree of opening of a valve structure,
   said valve structure comprising a movable valve member means movable in one direction upon an increase in the refrigerant temperature and in the opposite direction upon a decrease in the refrigerant temperature,
   said valve member means including a movable valve element, said element being provided with first port means communicating with an associated water source and the water to refrigerant heat pump,
   said valve structure being provided with port means in communication with said valve element and said first port means, and a biasing member disposed in said valve structure and biasing said movable valve element urging registration of said first port means with the port means in said valve structure, said moveable valve being provided with a temperature sensor for sensing the refrigerant temperature in the line between the condensor and the evaporator.

13. The invention according to claim 12, characterized by
   said first port means having an upper edge and said valve member means having an upper edge forming between said upper edges a variable orifice expandable with the valve element movable in one direction, and said second port means having a second edge and said valve element having a second edge cooperative therewith to provide a variable orifice which reduces in size as the valve member proceeds in the same direction,
   whereby movement of the valve structure in one direction allows a decreased flow of water to the refrigerant to water heat pump during the heating cycle and allows an increase of water to the refrigerant to water heat pump in the cooling cycle.

14. The invention according to claim 12, characterized by said valve arrangement having a neutral position, wherein minimal passage of water between each of the port means is allowed.

15. In a heat pump system for selectively heating and cooling a room, the system including a compressor, first and second heat exchangers each of which being connected through a reversing valve to a compressor, said reversing valve being controlled by a temperature responsive controller associated with said room, said controller being effective to initiate a cooling or a heating cycle in the system, a refrigerant line for conducting a refrigerant fluid between said first and second heat exchanger, said refrigerant line completing a closed refrigerant flow circuit, said first heat exchanger serving as an evaporator during a cooling cycle and as a condenser during a heating cycle, said second heat exchanger serving as a condenser during a cooling cycle and as an evaporator in a heating cycle, and a line for conducting water to and through said second heat exchanger in a heat transfer relationship with said refrigerant fluid, the improvement which comprises valve means responsive to temperature variations in said refrigerant line connecting both of said exchangers for regulating the flow of water in the water line leading to said second heat exchanger, said valve means comprising a valve having a body connected to an inlet pipe supplying water and connected to an outlet pipe connected to said second heat exchanger, said body being provided with a chamber in communication with said inlet and outlet pipes, a valve sleeve disposed in said chamber and defining flow ports in conjunction with said body, a valve element having an unsupported end and slidably disposed within said valve sleeve and provided with control ports adapted to move in a particular direction to align with said flow ports to regulate the flow of water between said pipes, an expandable and contractible temperature responsive sensing means disposed in said body and extending into said refrigerant line, and actuating means for moving said valve element with respect to said valve sleeve to control water flow between said pipes through said flow and control ports, said actuating means comprising a biasing member disposed in said body and adjacent said inlet pipe and biasing said valve element in a direction toward said sensing means, said valve element having an abutment pin, and said sensing means having a thermally sensitive pellet sealed in a cup having one end connected to a piston stem which abuts said abutment pin to translate the motion of expansion to said valve element in opposition to the force exerted by the biasing member.

* * * * *